United States Patent
Zeng et al.

(10) Patent No.: US 12,050,004 B2
(45) Date of Patent: Jul. 30, 2024

(54) BACKLIGHT MODULE AND DISPLAY DEVICE

(71) Applicants: MIANYANG HKC OPTOELECTRONICS TECHNOLOGY CO.,LTD, Mianyang (CN); HKC CORPORATION LIMITED, Shenzhen (CN)

(72) Inventors: Zhi Zeng, Mianyang (CN); Moo Keun Shin, Mianyang (CN); Haijiang Yuan, Mianyang (CN)

(73) Assignees: MIANYANG HKC OPTOELECTRONICS TECHNOLOGY CO., LTD, Mianyang (CN); HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 18/088,563

(22) Filed: Dec. 24, 2022

(65) Prior Publication Data

US 2023/0204187 A1 Jun. 29, 2023

(30) Foreign Application Priority Data

Dec. 29, 2021 (CN) .......................... 202111635002.4

(51) Int. Cl.
*F21V 3/00* (2015.01)
*F21V 7/05* (2006.01)
(Continued)

(52) U.S. Cl.
CPC .................. *F21V 3/00* (2013.01); *F21V 7/05* (2013.01); *F21Y 2105/16* (2016.08); *F21Y 2115/10* (2016.08)

(58) Field of Classification Search
CPC .......... F21V 3/00; F21V 7/05; F21Y 2105/16; F21Y 2115/10; G02F 1/133603;
(Continued)

(56) References Cited

U.S. PATENT DOCUMENTS

| | | | |
|---|---|---|---|
| 9,482,410 B2* | 11/2016 | Lee | H05B 45/20 |
| 11,112,555 B2* | 9/2021 | Emura | G02B 6/0055 |

FOREIGN PATENT DOCUMENTS

| | | |
|---|---|---|
| CN | 109613758 A | 4/2019 |
| CN | 109728021 A | 5/2019 |

(Continued)

OTHER PUBLICATIONS

CN 112856263, Xi Cheng, May 28, 2021, English Translation (Year: 2021).*

*Primary Examiner* — Peggy A Neils

(57) ABSTRACT

A backlight module and a display panel are disclosed. The backlight module includes an assembled light plate composed of multiple light plates assembled together. There is a gap between every two adjacent light plates. The backlight module further includes a light supplementation structure covering the gap and having a fixed end fixedly connected with one of the two adjacent light plates, and a free end located on the other one of the two adjacent light plates. The light supplementation structure is provided at the corresponding position of the gap to supplement light to the gap of the assembled light plate, and the light supplementation structure is only fixedly connected with one of the light plates on both sides of the gap, and is not connected with the other light plate.

17 Claims, 4 Drawing Sheets

(51) Int. Cl.
*F21Y 105/16* (2016.01)
*F21Y 115/10* (2016.01)

(58) Field of Classification Search
CPC ......... G02F 1/133605; G02F 1/133606; G02F 1/133608; G09F 9/302; G09F 9/35; G09F 9/3026
See application file for complete search history.

(56) References Cited

FOREIGN PATENT DOCUMENTS

| | | | | |
|---|---|---|---|---|
| CN | 110444124 A | 11/2019 | | |
| CN | 111323968 A | 6/2020 | | |
| CN | 112856263 | * 5/2021 | ....... | G02F 1/133603 |
| CN | 112856263 A | 5/2021 | | |
| CN | 214098031 U | 8/2021 | | |
| CN | 114203058 A | 3/2022 | | |
| CN | 114203069 A | 3/2022 | | |

* cited by examiner

BACKLIGHT MODULE AND DISPLAY DEVICE

CROSS-REFERENCE TO RELATED APPLICATIONS

This application claims the priority and benefit of Chinese patent application 2021116350024, entitled "Backlight Module and Display Device" and filed Dec. 29, 2021 with China National Intellectual Property Administration, the entire contents of which are incorporated herein by reference.

TECHNICAL FIELD

The present application relates to the field of display technology, and in particular, to a backlight module and a display device.

BACKGROUND

The description provided in this section is intended for the mere purpose of providing background information related to the present application but doesn't necessarily constitute prior art.

Generally, large-size assembled screens are mostly used in outdoor environments, and in order to avoid the deformation of the light plates due to influence by the environment, a safety gap will be reserved between adjacent light plates. However, when the display device is working, problems such as shadows and dark lines may occur at the positions corresponding to the safety gaps.

A reflective sheet may be disposed on the light plates on both sides of the gap to cover the gap, and then the reflective sheet may be connected to the light plates. In this way, although the above-mentioned problems such as shadows and dark lines can be alleviated to a certain extent, the stress generated by the deformation of the light plates will be transferred to the reflective sheet, which will cause damage to the reflective sheet or loosening relative to the light plates.

SUMMARY

It is therefore one purpose of the present application to provide a backlight module and a display device, in which the assembled light plate in the backlight module will not apply stress to the light supplementation structure at the gap when stress occurs due to deformation, so as to avoid damage to the light supplementation structure and to prevent the light supplementation structure from loosening relative to the assembled light plates.

The application discloses a backlight module, including an assembled light plate. The assembled light plate is composed of a plurality of light plates assembled together. There is a gap between the two adjacent light plates. The backlight module further includes a light supplementation structure. The light supplementation structure has a fixed end and a free end. The fixed end is fixedly connected with one of the two adjacent light plates. The light supplementation structure covers the gap. The free end is disposed on the other one of the two adjacent light plates.

Optionally, the light supplementation structure is provided with a plurality of through holes, and the through holes are divided into a first through hole and a second through hole. The light plate is provided with a first raised portion, and the first through hole is fixedly connected to the first protrusion on one of the two adjacent light plates. The second through hole is fitted and connected with the first protrusion on the other of the two adjacent light plates, and a gap is provided be-tween the second through hole and the first protrusion.

Optionally, the first protrusion protrudes out of the light supplementation structure through the through hole.

Optionally, a plurality of the first protrusions are provided on each light plate and are evenly arranged; the plurality of the first protrusions are provided in a one-to-one correspondence with the plurality of the through holes.

Optionally, the height of the light supplementation structure is the same as the height of the first raised portion.

Optionally, the light supplementation structure includes a first light supplementation structure and a second supplemental light structure with the same thickness. The first light supplementation structure covers a plurality of the gaps connected in sequence on the same horizontal line. The second light supplementation structure covers a plurality of the gaps connected in sequence on the same vertical line. The first light supplementation structure and the second light supplementation structure are arranged overlapping each other, and the sum of the thickness of the overlapped portions of the first light supplementation structure and the second light supplementation structure is equal to the thickness of the first light supplementation structure or the second light supplementation structure.

Optionally, the backlight module further includes a diffusion sheet. The diffusion sheet covers at least one row of light-emitting diodes in at least one of the light plates near the gap, and the number of light emitting diodes covered by the fixed end of the diffusion sheet is smaller than the number of light emitting diodes covered by the unfixed end of the diffusion sheet.

The application further discloses a backlight module, comprising an assembled light plate. The assembled light plate is composed of a plurality of light plates assembled together. There is a gap between the adjacent light plates. The backlight module further includes a light supplementation structure, and the light supplementation structure covers the gap. The light supplementation structure is provided with a plurality of through holes, and the plurality of through holes are divided into a third through hole and a fourth through hole. Two adjacent light plates are each provided with a second protrusion. The third through hole is fixedly connected with the second protrusion on one of the two adjacent light plates. The fourth through hole is fixedly connected to the second protrusion on the other of the two adjacent light plates, and the material of the second protrusion is a plastic material.

Optionally, the shape of the second protrusion is cylindrical, the third through hole and the fourth through hole are circular through holes, and the outer diameter of the second protrusion is equal to the inner diameter of the third through hole and the fourth through hole.

The present application further discloses a display device. The display device includes a display panel and the abovementioned backlight module. The backlight module and the display panel are set oppositely. The backlight module provides a backlight source for the display panel.

Compared with the scheme of arranging a reflective sheet on the light plates on both sides of the gap, using the reflective sheet to block the gap, and then connecting the reflective sheet to the light plates, the present application provides a light supplementation structure at the corresponding position of the gap to supplement light to the gap of the assembled light plates, and the light supplementation structure is only fixedly connected to one of the light plates on both sides of the gap, and is not connected to the other light plate. When the light plate is deformed, the light supplementation structure can move relative to another light plate, which avoids the stress of the deformation of the light plate being applied to the light supplementation structure and causing damage to the light supplementation structure.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Obviously, the drawings used in the following description merely depict some embodiments of the present application, and for those having ordinary skill in the art, other drawings can also be obtained from these drawings without investing creative effort. In the drawings.

DETAILED DESCRIPTION OF EMBODIMENTS

It should be understood that the terminology used herein, the specific structural and functional details disclosed are intended for the mere purpose of describing specific embodiments and are representative, but the present application may be embodied in many alternative forms and should not be construed as limited only the embodiments set forth herein.

In addition, unless otherwise expressly specified and defined, terms "installed on", "connected to", and "coupled to" should be understood in a broad sense. For example, it may be a fixed connection, a detachable connection, or an integral connection; it may be a mechanical connection, or may also be an electrical connection; it may be a direct connection, an indirect connection through an intermediate medium, or an internal connection between two components. For those having ordinary skill in the art, the specific meanings of the above terms in this application can be understood depending on specific contexts.

The present application will be described in detail below with reference to the accompanying drawings and optional embodiments.

Figure 1:
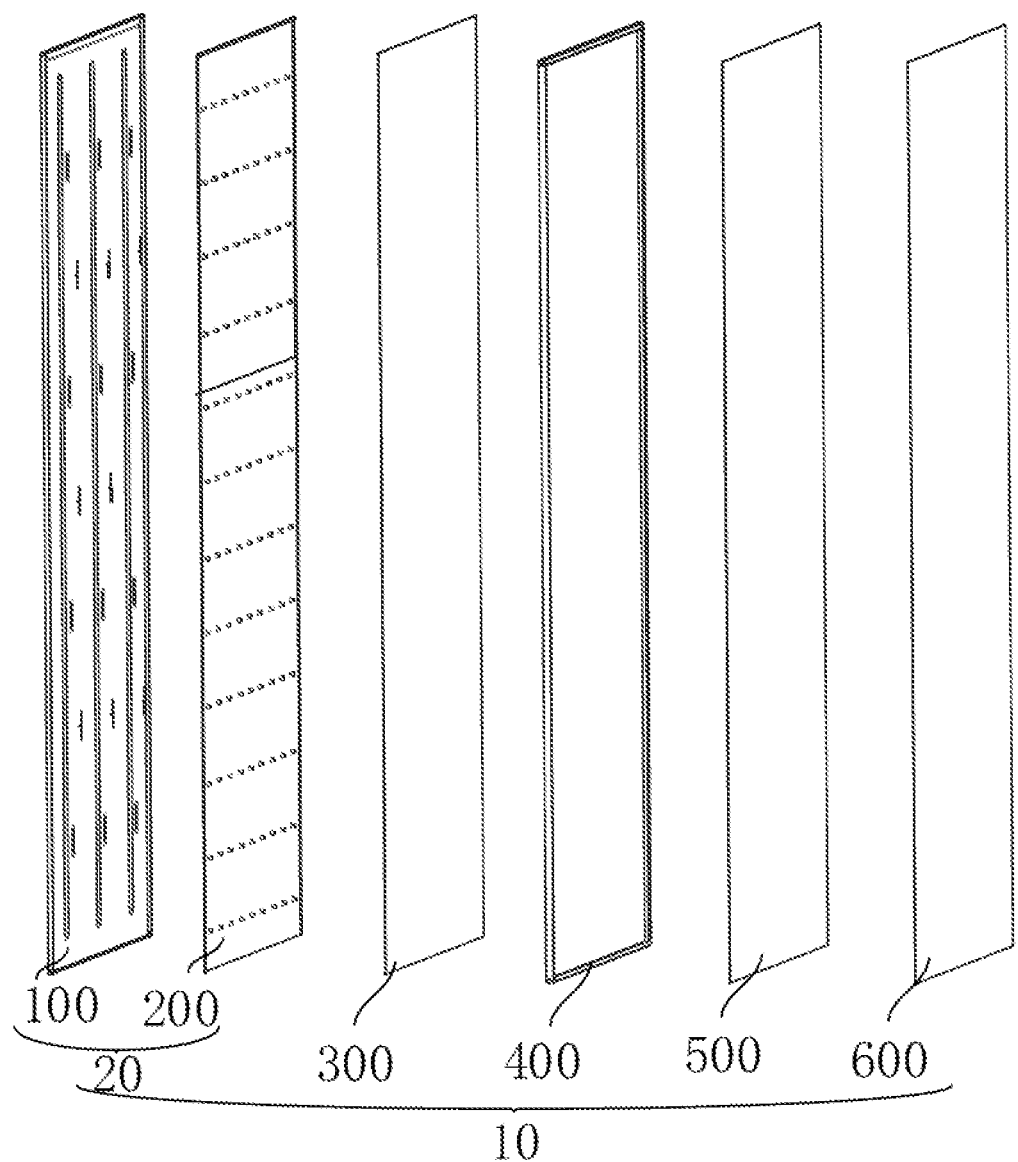
FIG. 1 is an exploded schematic diagram of a display device according to an embodiment of the present application.

FIG. 1 is an exploded schematic diagram of a display device according to an embodiment of the present application. As shown in FIG. 1, a display device 10 is disclosed. The display device 10 includes a display panel 600 and a backlight module 20. The backlight module 20 and the display panel 600 are oppositely arranged. The backlight module 20 provides a backlight source for the display panel 600.

Specifically, the backlight module 20 includes a back plate 100 and an assembled light plate 200. The back plate 100 and the assembled light plate 200 are oppositely arranged. The display device 10 further includes an optical film 300, a sealant frame 400, and a foam 500. The back plate 100, the assembled light plate 200, the optical film 300, the foam 500, and the display panel 600 are stacked in sequence. The sealant frame 400 is disposed around the edges of the assembled light plate 200, the optical film 300, the foam 500, and the display panel 600. The backlight module further includes a light supplementation structure, which covers the gap between the adjacent light plates and is fixedly connected with the light plates to supplement light to the gap. The specific implementation is described below with reference to three embodiments.

Embodiment 1

Figure 2:
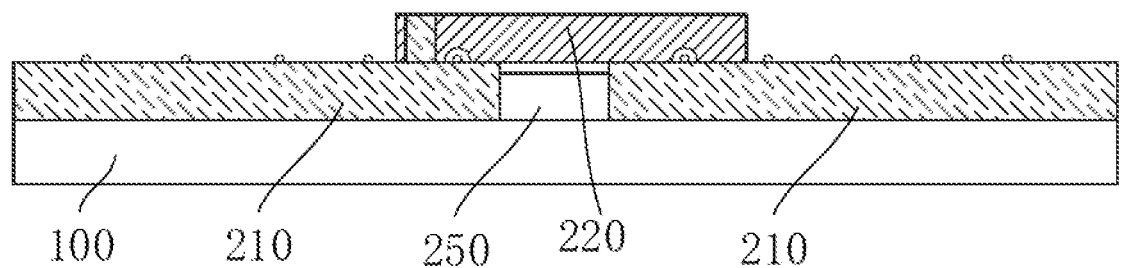
FIG. 2 is a cross-sectional view of a backlight module according to a first embodiment of the present application.

As shown in FIG. 2, FIG. 2 is a cross-sectional view of a backlight module according to a first embodiment of the present application, and discloses a backlight module 20. The backlight module 20 includes an assembled light plate 200. The assembled light plate 200 is composed of a plurality of light plates 210 assembled together. There is a gap 250 between two adjacent light plates 210. The backlight module 20 further includes a light supplementation structure 220. The light supplementation structure 220 has a fixed end and a free end. The fixed end is fixedly connected with one of the two adjacent light plates 210. The light supplementation structure 220 covers the gap 250, and the free end is disposed on the other one of the two adjacent light plates 210.

The light supplementation structure 220 is disposed at a position corresponding to the gap 250 to supplement light to the gap 250 of the assembled light plate 200, and the light supplementation structure 220 is only connected to one of the light plates 210 on both sides of the gap 250, and is not connected with the other light plate 210. That is, the light supplementation structure 220 is directly erected on the light-emitting surface of the other light plate 210. When one light plate 210 is deformed, the light supplementation structure 220 and another light plate 210 can move relative to each other, so as to avoid the stress generated by the deformation of the light plate 210 from being applied to the light supplementation structure 220, otherwise causing damage to or loosening of the light supplementation structure 220. The fixing method between the light supplementation structure 220 and the light plates 210 may be by means of an adhesive tape or glue.

Figure 3:
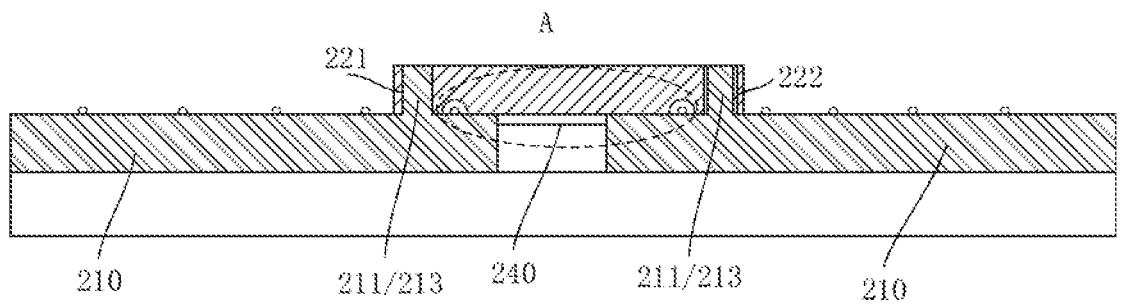
FIG. 3 is a schematic diagram of a first through hole a the second through hole on a light supplementation structure that are fitted with a first protrusion on a light plate according to the first embodiment of the present application.
Figure 4:
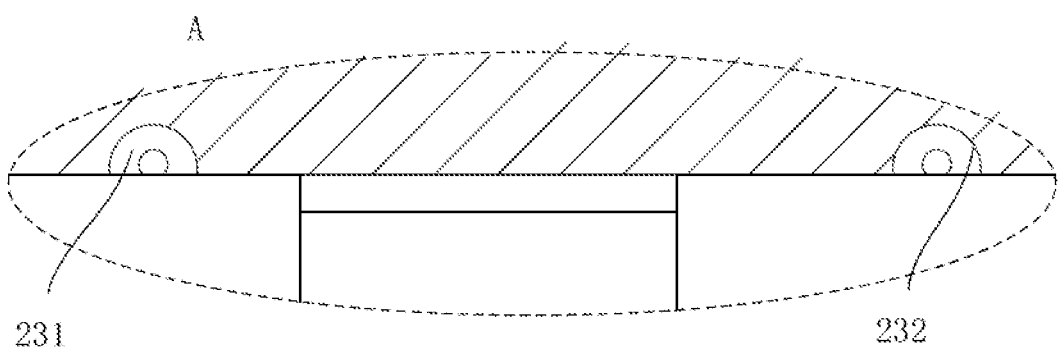
FIG. 4 is an enlarged schematic diagram of the area A shown in FIG. 3.

As shown in FIGS. 3 and 4, in the present application a plurality of through holes are provided in the light supplementation structure 220, wherein the through holes are divided into a first through hole 221 and a second through hole 222. The light plate 210 is provided with a first protrusion 211, and the first through hole 221 and the first protrusion 211 are fixedly connected. The second through hole 222 is matched and connected with the first protrusion 211 on the other adjacent light plate 210. A gap is provided between the second through hole 222 and the first protrusion 211. The first through hole 221 corresponds to the fixed end of the light supplementation structure 220, and the second through-hole 222 corresponds to the free end of the light supplementation structure 220.

The first through hole 221 is opened in the light supplementation structure 220, and the first through hole 221 is fixedly connected to the first protrusion 211 on the light plate 210. There is also a second through hole 222 in the light supplementation structure 220. The second through hole 222 is sleeved on the first protrusion 211 on the other adjacent light plate 210, and a gap is set therebetween. The gap is a safety distance, and the safety distance is a distance that is traveled by the light plate 210 when the light plate 210 is deformed during thermal expansion and contraction. It can be understood that even if the light plate 210 is deformed, the first protrusion 211 on the adjacent light plate 210 will not be in contact with the hole wall of the second through hole 222 to cause damage to the light supplementation structure 220. It is equivalent to reserving a safety distance in advance between the light supplementation structure 220 and the light plate 210. Furthermore, compared with the glue solution, in the way of fixed connection between the first protrusion 211 and the first through hole 221, there is no need to worry about the influence of the overflow glue on the light plate 210. There is also no need to locate the light supplementation structure 220 and then connect it, which is more convenient for later disassembly, and also has the function of auxiliary fixing for the light plates.

Further, the first protrusion 211 protrudes out of the light supplementation structure 220 through the through hole. Since above the light plate 210 is the optical film 300, when the display device 10 is assembled, a support column 213 will be arranged between the light plate 210 and the optical film 300. When the light supplementation structure 220 is small, a first protrusion 211 is separately provided on the light plate 210 to cooperate with the light supplementation structure 220 for fixing. When the light supplementation structure 220 is relatively large, the support column 213 on the light plate 210 is directly used as the first protrusion 211 to be fixedly connected to the light supplementation structure 220.

In addition, the support column 213 and the light plate 210 are integrally formed, so that the connection between the light supplementation structure 220 and the light plate 210 is more stable. Furthermore, by arranging the plurality of the first protrusions 211 to directly support the optical film 300, there may not be need to arrange a supporting member 213 on the light plate 210.

That is, the first protrusions 211 on each light plate are provided with a plurality and are evenly arranged. The plurality of the first protrusions 211 are provided in a one-to-one correspondence with the plurality of the through holes. Through the plurality of uniformly arranged first protrusions 211 and the plurality of through holes that are fixedly connected, while improving the stability of the connection, the plurality of the first protrusions 211 can replace the supporting member 213 on the original light plates to support the optical film 300. The first protrusion 211 may be rectangular or circular, and the through hole is arranged in cooperation with the first protrusion.

Further, the height of the light supplementation structure 220 may also be the same as the height of the first protrusion 211. The end of the light supplementation structure 220 away from the gap 250 and the end of the first protrusion 211 away from the respective light plate 210 are located on the same plane. The side of the light supplementation structure 220 away from the gap 250 is in contact with the optical film 300. The light supplementation structure 220 is used to support the optical film 300, so that the point support with the first protrusion 211 is been replaced by the surface support of the first protrusion 211 in cooperation with the light supplementation structure 220. The contact area between the first protrusion 211 and the optical film 300 is thus shared, avoiding the dark spot at the position of the display device 10 corresponding to the first protrusion 211 that is formed by extrusion because the first protrusion 211 abuts against and presses the optical film 300.

Figure 5:
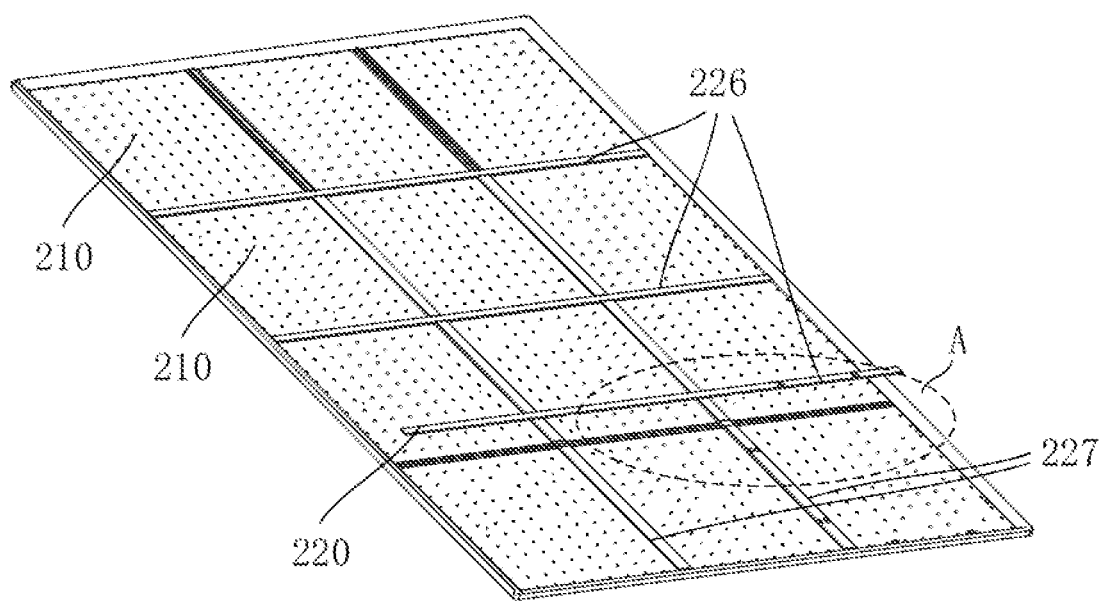
FIG. 5 is a schematic diagram of an assembled light plate according to the first embodiment of the present application.
Figure 6:
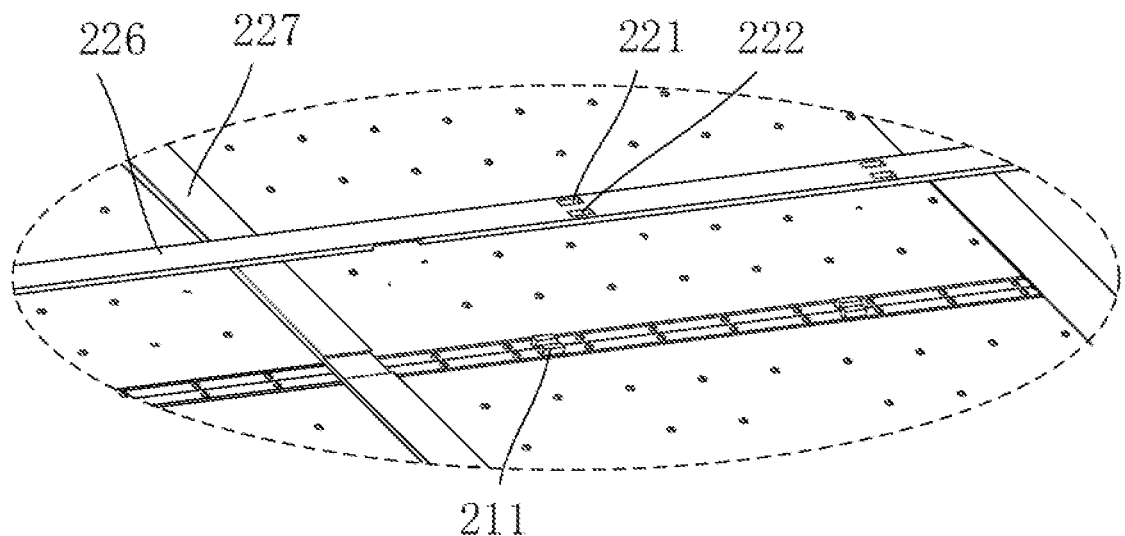
FIG. 6 is an enlarged schematic diagram of the area A shown in FIG. 5.

As shown in FIGS. 5 and 6, the assembled light plates 200 may be assembled by a plurality of light plates 210, so there will be a position where the gaps 250 meet. The light supplementation structure 220 includes a first light supplementation structure 226 and a second light supplementation structure 227 with the same thickness. The first light supplementation structure 226 covers a plurality of the gaps 250 connected in sequence on the same horizontal line. The second light supplementation structure 227 covers a plurality of gaps 250 connected in sequence on the same vertical line. The first light supplementation structure 226 and the second light supplementation structure 227 are arranged to overlap each other, and the sum of the thicknesses of the overlapping positions of the first light supplementation structure 226 and the second supplementary light 227 is equal to the thickness of the first light supplementation structure 226 or the second light supplementation structure 227. That is, the first light supplementation structure 226 and the second light supplementation structure 227 are interlocked with each other, by means of notches, for example.

Compared with using a single light supplementation structure 220 in each gap 250, this solution adopts an entire light supplementation structure 220, so that the light supplementation structures 220 in the entire light plate 210 are not easy to fall off. Furthermore, the position where the light supplementation structures 220 intersect is connected in a snap-fit manner, which ensures that the position of the display device 10 corresponding to the overlap of the first light supplementation structure 226 and the second light supplementation structure 227 will not become dark.

The light supplementation structure 220 may be a structure with its own light source, or may be a reflective sheet 40. The backlight module 20 of the present application further includes a diffusion sheet 230. One end of the diffusion sheet 230 is fixedly connected with the light plate 210, and the other end is movable with respect to the other light plate 210 of the two adjacent light plates 210. The light supplementation structure 220 covers at least one row of light-emitting diodes in at least one of the light plates 210 near the gap 250. In addition, the number of light-emitting diodes covered by the fixed end of the diffusion sheet 230 is smaller than the number of light-emitting diodes covered by the non-fixed end of the diffusion sheet 230.

By using the diffusion sheet 230 to direct the light on the light plate 210 evenly to the gap 250, no external light source is required. In addition, compared with the solution of using the reflective sheet to supplement light to the gap 250, the use of the diffusion sheet 230 to supplement the light makes the light softer, and the cost of the diffusion sheet 230 is also lower.

Further, because the fixed end of the diffusion sheet 230 to the light plate 210 is fixed by the first protrusion 211, the first protrusion 211 will block some light. Therefore, the number of light emitting diodes covered by the fixed end of the diffusion sheet 230 is smaller than the number of light emitting diodes covered by the unfixed end of the diffusion sheet 230, so as to transmit more light to the diffusion sheet 230, supplement light at the gap 250, and improve the light supplementation effect.

Moreover, the diffusion sheet 230 is provided with a diffusion cavity 231 at the position corresponding to the light emitting diode, and the diameter of the diffusion cavity 231 is larger than that of the light emitting diode. That is, a safety distance is set between the cavity wall of the diffusion cavity 231 and the light emitting diode. The safety distance is a distance reserved in advance to prevent the diffusion sheet 230 from bumping against the light emitting diode when the light plate 210 is deformed due to thermal expansion and contraction.

A reflective structure 232 is disposed on the side of the cavity wall of the diffusion cavity 231 away from the gap 250, and the reflective structure 232 reflects the light emitted by the light emitting diode in the diffusion cavity 231 toward the gap 250, further improving light utilization rate.

Furthermore, the diffusion sheet 230 is also provided with a reflective sheet 240. The reflective sheet 240 shields the gap 250. The reflective surface of the reflecting sheet 240 is attached to the side of the diffusion sheet 230 adjacent to the gap 250, and the light at the diffusion sheet 230 corresponding to the gap 250 is reflected again, which further improves the utilization rate of light.

Further, the diffusion sheet 230 covers the light plates 210 on both sides of the gap 250 at the same time, and only covers a row of light emitting diodes on each light plate 210 near the gap 250. The first protrusion 211 on the light plate 210 is disposed on the side of the light emitting diode covered by the diffusion sheet 230 away from the gap 250 to prevent the first protrusion 211 from blocking the light emitted by the light emitting diode.

Embodiment 2

Figure 7:
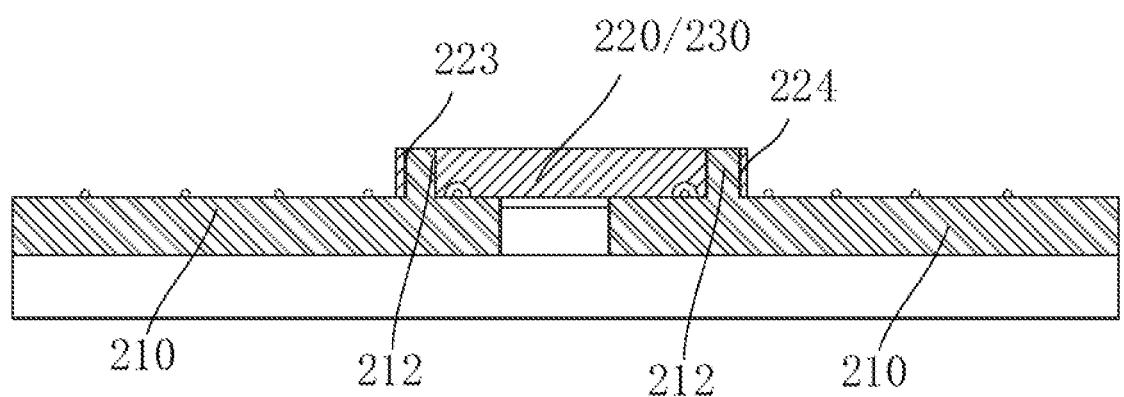
FIG. 7 is a cross-sectional view of a backlight module according to a second embodiment of the present application.

FIG. 7 is a cross-sectional view of a backlight module according to a second embodiment of the present application. As shown in FIG. 7, different from the first embodiment, the light supplementation structure 220 is fixedly connected to the two adjacent light plates 210 at the same time.

Specifically, a backlight module 20 is disclosed, including an assembled light plate 200. The assembled light plate 200 is composed of a plurality of light plates 210 assembled together. There is a gap 25 between the adjacent light plates 210. The backlight module 20 further includes a light supplementation structure 220, and the light supplementation structure 220 covers the gap 250. The light supplementation structure 220 is provided with a plurality of through holes. The plurality of through holes are divided into a third through hole 223 and a fourth through hole 224. Two adjacent light plates 210 are each provided with a second protrusion 212. The third through hole 223 is fixedly connected to the second protrusion 212 on one of the two adjacent light plates 210. The fourth through hole 224 is fixedly connected with the second protruding portion 212 on the other one of the two adjacent light plates 210, and the material of the second protruding portion 212 is plastic.

The third through hole 223 is in an interference fit with the second protrusion 212 on one of the two adjacent light plates 210. The fourth through hole 224 is in an interference fit with the second protruding portion 212 on the other one of the two adjacent light plates 210.

Compared with the first embodiment, in this solution, the light supplementation structure 220 is fixed to both of the two light plates 210 adjacent to the gap 250 to ensure the stability of the light supplementation structure 220.

Secondly, by using the plastic material to make the second protruding portion 212, due to the elasticity of the plastic material, the second protruding portion 212 can convert the stress generated by the deformation of the light plates 210 into elasticity, so as to be stored in the second protruding portion 212 and not transmitted to the light supplementation structure 220, thereby preventing the light supplementation structure 220 from being damaged.

The shape of the second protrusion 212 is cylindrical. The third through hole 223 and the fourth through hole 224 are circular through holes. The outer diameter of the second protrusion 212 is equal to the inner diameter of the third through hole 223 and the fourth through hole 224. The cylindrical through hole cooperates with the cylindrical protrusion, so that when receiving the stress of the light plates 210, the force is more uniform, and it is not easy to break.

The height of the light supplementation structure 220 is the same as the height of the second protruding portion 212. The side of the light supplementation structure 220 away from the gap 250 and the end of the second protrusion 212 away from the light plates 210 are located on the same plane. That is, the side of the light supplementation structure 220 away from the gap 250 abuts with the optical film 300. The light supplementation structure 220 is used to support the optical film 300, so that the point support of the second protrusion 212 is replaced with the surface support of the second protrusion 212 in conjunction with the light supplementation structure 220, avoiding dark spots formed by extrusion at the position of the display device 10 corresponding to the second protruding portion 212.

Embodiment 3

Figure 8:
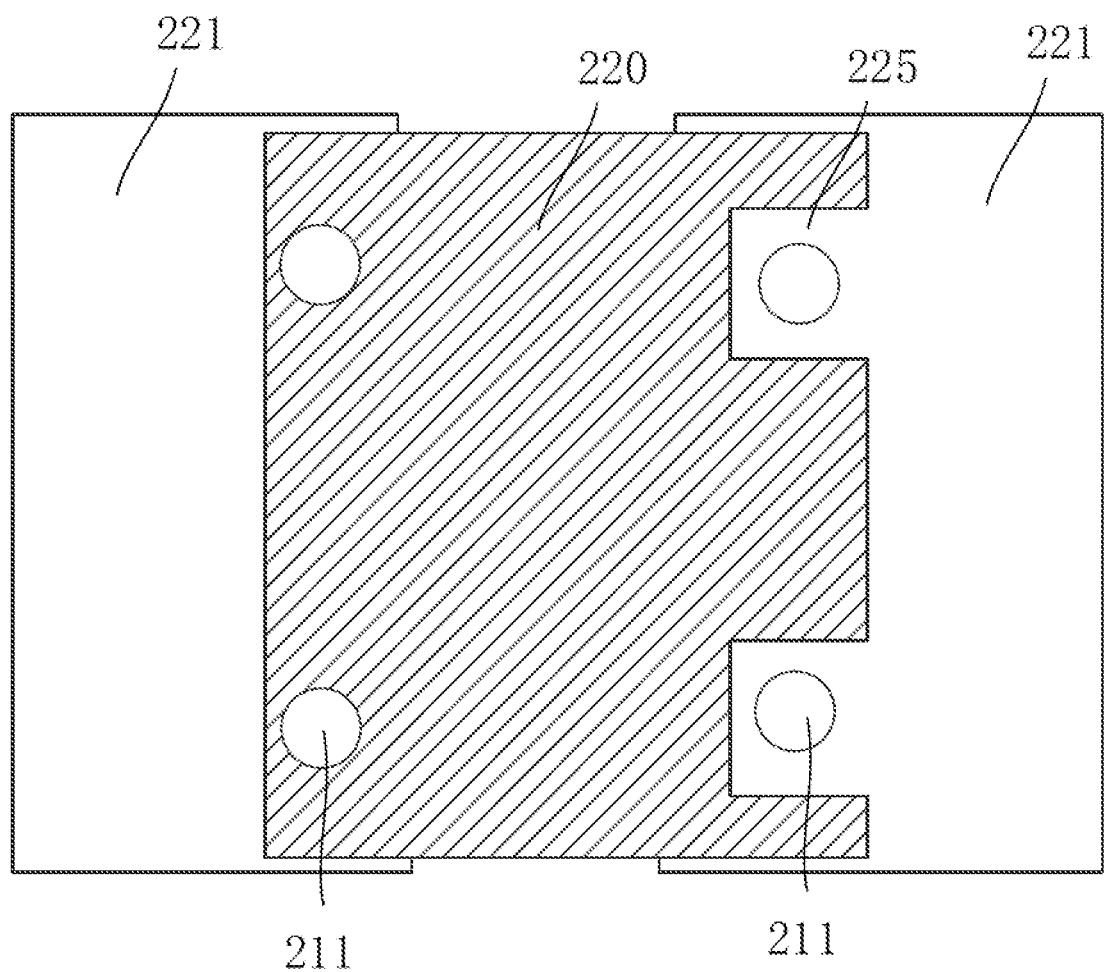
FIG. 8 is a top view of the fitting of a light supplementation structure and an assembled light plate according to a third embodiment of the present application.

FIG. 8 is a top view of a light supplementation structure fitted with an assembled light plate according to the third embodiment of the present application. As shown in FIG. 8, different from the first embodiment, the light supplementation structure 220 is provided with a notch 225 at the position corresponding to the first protrusion 211 on the other light plate 210 adjacent to the gap 250. The notch 225 half surrounds the corresponding first protrusion 211. The notch 225 faces away from the gap 250.

One end of the light supplementation structure 220 is fixedly connected with the light plate, and the other end is matched with the other light plate 210 adjacent to the gap 250 through the fitting of the first protrusion 211 and the gap 225, so that the installation is more convenient. In addition, the light supplementation structure 220 avoids the first protrusion 211 on the other light plate adjacent to the gap, so as to prevent the light supplementation structure 220 from being damaged due to bumping.

The foregoing is a further detailed description of the present application in conjunction with specific optional embodiments, but it should not be construed as that the specific implementation of the present application will be limited to these descriptions. For those having ordinary skill in the technical field of the present application, without departing from the scope and spirit of the present application, some simple deductions or substitutions can be made, which should all be regarded as falling in the scope of protection of the present application.

What is claimed is:

1. A backlight module, comprising an assembled light plate, the assembled light plate comprising a plurality of light plates assembled together, and there is a gap between every two adjacent light plates, wherein the backlight module further comprises a light supplementation structure, which has a fixed end and a free end, wherein the fixed end of the light supplementation structure is fixedly connected to one of the two adjacent light plates, the light supplementation structure covers the gap, and the free end of the light supplementation structure is located on the other one of the two adjacent light plates.

2. The backlight module of claim 1, wherein the light supplementation structure is only connected to one of the light plates on both sides of the gap, and is not connected with the other light plate.

3. The backlight module of claim 1, wherein a plurality of through holes are defined in the light supplementation structure and comprise a first through hole and a second through hole, wherein a first protrusion is provided on each of the two adjacent light plates, and wherein the first through hole is fixedly connected to the first protrusion on one of the two adjacent light plates; and wherein the second through hole is matched and connected with the first protrusion on the other of the two adjacent light plates, and a gap is defined between the second through hole and the first protrusion.

4. The backlight module of claim 3, wherein the first protrusion protrudes out of the light supplementation structure through the first through hole.

5. The backlight module of claim 3, wherein a plurality of the first protrusions are disposed on each of the light plates and are evenly arranged; wherein the plurality of first protrusions are arranged in a one-to-one correspondence with the plurality of through holes.

6. The backlight module of claim 3, wherein a height of the light supplementation structure is equal to a height of the first protrusion.

7. The backlight module of claim 1, wherein the light supplementation structure comprises a first light supplementation structure and a second light supplementation structure with equal thickness, and wherein the first light supplementation structure covers a plurality of the gaps that are connected in sequence along a same horizontal line;

the second light supplementation structure covers a plurality of the gaps that connected in sequence along a same vertical line;

wherein the first light supplementation structure and the second light supplementation structure are arranged to overlap each other, and a sum of thicknesses of overlapping portions of the first light supplementation structure and the second light supplementation structure is equal to a thickness of the first light supplementation structure or the second light supplementation structure at a non-overlapping portion.

8. The backlight module of claim 1, further comprising a diffusion sheet, which covers at least one row of light-emitting diodes that are disposed in at least one of the two adjacent light plates and that are adjacent to the gap, and wherein a number of light emitting diodes covered by a fixed end of the diffusion sheet is smaller than a number of light emitting diodes covered by an unfixed end of the diffusion sheet.

9. The backlight module of claim 4, wherein the backlight module further comprises an optical film arranged on a side of a light-emitting surface of the assembled light plate, and wherein the plurality of first protrusions directly support the optical film.

10. The backlight module of claim 7, wherein the first light supplementation structure and the second light supplementation structure are interlocked with each other.

11. The backlight module of claim 1, wherein the light supplementation structure is a reflective sheet.

12. The backlight module of claim 8, wherein a diffusion cavity is disposed at a position of the diffusion sheet corresponding to the light emitting diode, and wherein a diameter of the diffusion cavity is larger than that of the light emitting diode.

13. The backlight module according to claim 12, wherein a reflective structure is disposed on a side of a cavity wall of the diffusion cavity away from the gap.

14. The backlight module of claim 8, wherein a reflective sheet is further arranged on the diffusion sheet, the reflective sheet blocks the gap, and a reflective surface of the reflecting sheet is attached to a side of the diffusion sheet adjacent to the gap.

15. The backlight module of claim 8, wherein the diffuser covers the light panels on both sides of the gap at the same time, and only covers a row of light emitting diodes on each light panel adjacent to the gap, wherein the first protrusion on the light plate is disposed on the side of the light emitting diode covered by the diffusing sheet away from the gap.

16. A display device, comprising a display panel and a backlight module, wherein the backlight module and the display panel being oppositely arranged, and wherein the backlight module is configured to provide a backlight for the display panel; wherein the backlight module comprises an assembled light plate, the assembled light plate comprising a plurality of light plates that are assembled together, and there is a gap between every two adjacent light plates, wherein the backlight module further comprises a light supplementation structure, which covers the gap;

wherein the light supplementation structure has a fixed end and a free end, wherein the fixed end of the light supplementation structure is fixedly connected to one of the two adjacent light plates, and the free end is located on the other one of the two adjacent light plates.

17. The display device of claim 16, wherein a plurality of through holes are defined in the light supplementation structure and comprise a third through hole and a fourth through hole, and the two adjacent light plates are each provided with a second protrusion;

wherein the third through hole is fixedly connected with the second protrusion on one of the two adjacent light plates;

wherein the fourth through hole is fixedly connected with the second protruding portion on the other one of the two adjacent light plates, and the second protruding portion is of a plastic material;

wherein the second protruding portion is operative to convert a stress generated by a deformation of the light plates into elasticity, so as to be stored in the second protruding portion and not transmitted to the light supplementation structure.

* * * * *